F. L. UDELL & G. E. PREDOCK.
CLOTHES POUNDER.
APPLICATION FILED MAY 19, 1913.

1,093,016.

Patented Apr. 14, 1914.

Witnesses:
Geo. P. Ladrou
C. M. Badger

Inventors:
Frank L. Udell and
George E. Predock.
By Bakewell & Cornwell attys.

COLUMBIA PLANOGRAPH CO., WASHINGTON, D. C.

UNITED STATES PATENT OFFICE.

FRANK L. UDELL AND GEORGE E. PREDOCK, OF ST. LOUIS, MISSOURI.

CLOTHES-POUNDER.

1,093,016.

Specification of Letters Patent.

Patented Apr. 14, 1914.

Application filed May 19, 1913. Serial No. 768,587.

*To all whom it may concern:*

Be it known that we, FRANK L. UDELL and GEORGE E. PREDOCK, both citizens of the United States, residing at 2315 North Broadway, in St. Louis, Missouri, have invented a certain new and useful Improvement in Clothes-Pounders, of which the following is a full, clear, and exact description, such as will enable others skilled in the art to which it appertains to make and use the same.

This invention relates to clothes-pounders, and has for its object to provide a strong and efficient clothes-pounder that can be manufactured at a low cost.

Another object is to provide a clothes-pounder of simple construction that will agitate the water violently but without causing the water to splash out of the receptacle that contains the water, the pounder being provided with a member that protects the clothes being washed and also causes the water to be churned up so that the soap in same will be converted into a mass of suds or foam.

Other objects and desirable features of our invention will be hereinafter pointed out.

Figure 1:
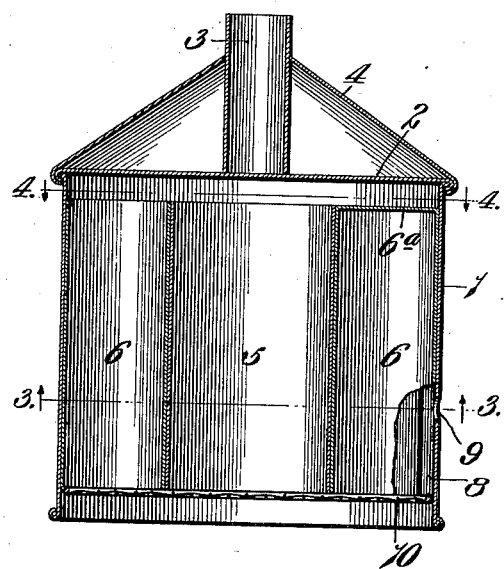
Figure 2:
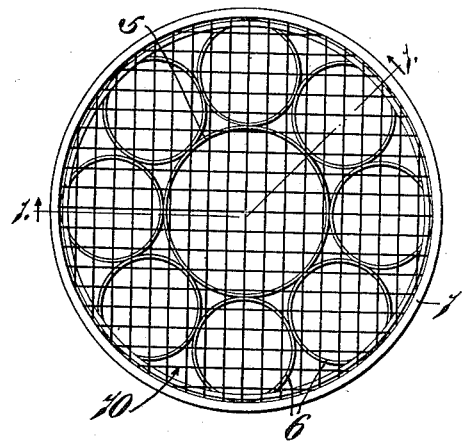
Figure 3:
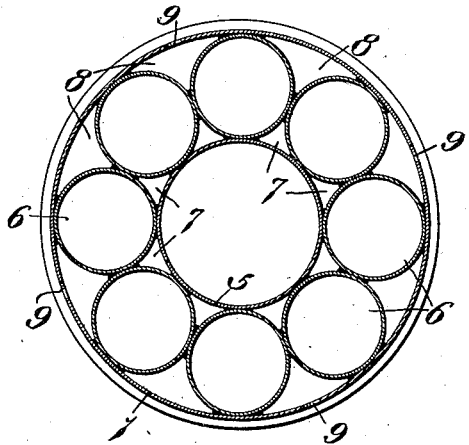

Figure 1 is a vertical sectional view of our improved clothes-pounder, said view being taken on approximately the line 1—1 of Fig. 2; Fig. 2 is a bottom plan view of the pounder; Fig. 3 is a horizontal sectional view taken on the line 3—3 of Fig. 1; and Fig. 4 is a horizontal sectional view taken on the line 4—4 of Fig. 1.

As shown in the drawings which illustrate the preferred form of our invention, the pounder consists of a cylindrical-shaped shell 1 open at its lower end and preferably provided at its upper end with a top wall 2. A tubular-shaped socket 3 is connected to said top wall for receiving the stick or handle, not shown, by which the pounder is actuated, and a reinforcing member 4, preferably cone-shaped, is connected to the socket 3 and to the upper end of the shell 1 so as to reinforce and strengthen the device. A tubular-shaped member 5 is arranged inside of the shell 1 at the center of same, and a plurality of smaller tubular-shaped members 6 are arranged inside of the shell around the center member 5, all of said tubular members being rigidly connected together and the members 6 being also connected to the shell. The members 5 and 6 terminate a short distance below the top wall 2 of the shell, and the center member 5 and some of the members 6 that surround the same are open at both ends so that the water can flow upwardly through the same when the pounder is forced down through the water. The other members 6 are closed at their upper ends by top walls $6^a$ so that they will form suction chambers that tend to pull the water upwardly when the pounder is raised or moved upwardly. In the embodiment of our invention herein shown every alternate member 6 is provided with a top wall $6^a$, as shown in Fig. 4, so that the annular space between the shell and the center tubular-shaped member 5 is filled by suction chambers and open-ended tubular-shaped members arranged alternately. The center member 5 and also the members 6 are preferably cylindrical-shape so that a plurality of vertically-disposed passageways 7 will be formed between the members 5 and 6, and a separate set of vertically-disposed passageways 8 will be formed between the members 6 and the shell 1. In order that jets of water will be thrown laterally with great force or pressure when the pounder is forced downwardly through the water, we have formed ports 9 in the shell 1, as shown in Figs. 1 and 3. When the pounder is forced downwardly, the air inside of the shell is compressed to such a degree that jets of water spurt laterally from the ports 9 with great pressure. When the pounder is moved upwardly, the partial vacuum that is created in the members 6 whose upper ends are closed tends to draw the water upwardly. Consequently, the up and down movement of the pounder in the water agitates the water violently but without splashing the water out of the receptacle which contains the same.

Figure 4:
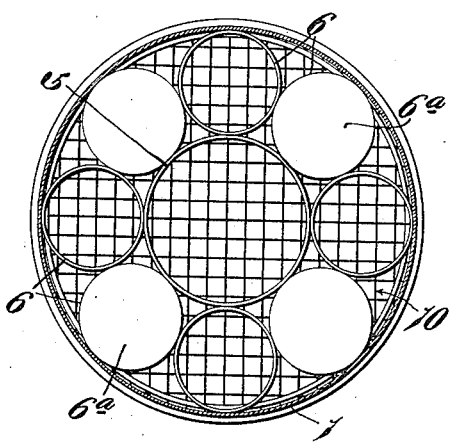

In order that the clothes will not be cut by the lower ends of the members 5 and 6 or jammed up into same, we have arranged a screen 10 over the lower ends of said members, as shown in Figs. 1, 2 and 4, said screen being preferably connected to the shell 1. The screen 10 not only prevents the clothes from being injured by the pounder but it also churns up the water and causes the soap in the water to be converted into foam or suds.

A clothes-pounder of the construction above described can be manufactured at a low cost on account of its simplicity. It is strong and rigid, and it agitates the water so violently that the water is forced through the clothes with great pressure, thereby cleansing the clothes quickly and effectively. The pounder is easy to operate, it does not splash the water out of the receptacle in which the clothes are being washed, and the most delicate fabrics and articles can be washed without liability of injuring them owing to the fact that there are no projections on the pounder or crevices or recesses in same on which the clothes can catch or into which the clothes will be forced during the operation of using the pounder.

Having thus described our invention, what we claim as new and desire to secure by Letters Patent is:

1. A clothes-pounder consisting of a cylindrical shell closed at its upper end and provided in its sides with ports, and a plurality of vertically-disposed cylindrical members arranged inside of said shell, some of said members being open at both ends and spaced away from the top wall of the shell and others of said members being closed at their upper ends so that they will form suction chambers.

2. A clothes-pounder consisting of a cylindrical shell open at its lower end and closed at its upper end, the shell having ports formed in the side walls of same, a plurality of open-ended cylindrical members arranged in said shell and spaced away from the top wall of the shell, and a plurality of cylindrical suction chambers arranged inside of the shell.

3. A clothes-pounder consisting of a cylindrical shell open at its lower end and closed at its upper end, the shell having ports formed in the side walls of same, a plurality of open-ended cylindrical tubular-shaped members arranged in said shell and spaced away from the top wall of the same, and a plurality of cylindrical suction chambers closed at their top arranged inside of the shell, and a screen at the lower end of the shell that extends across the lower ends of the members arranged inside of the shell.

4. A clothes-pounder consisting of a cylindrical-shaped shell closed at its upper end and open at its lower end, a socket for receiving the handle by which the pounder is actuated, a cone-shaped reinforcing member at the upper end of the shell connected to said socket, an open-ended cylindrical-shaped member arranged inside of the shell at the center of the same, a plurality of vertically-disposed cylindrical-shaped members arranged inside of the shell around said central member, a screen at the lower end of the shell which extends over the members arranged inside of the shell, and ports formed in the side of the shell, some of said vertically-disposed cylindrical-shaped members being closed at their upper ends and the others being open at both ends.

In testimony whereof, we hereunto affix our signatures, in the presence of two witnesses, this sixteenth day of May, 1913.

FRANK L. UDELL.
GEORGE E. PREDOCK.

Witnesses:
 WELLS L. CHURCH,
 GEORGE BAKEWELL.

---

Copies of this patent may be obtained for five cents each, by addressing the "Commissioner of Patents, Washington, D. C."